United States Patent [19]

Councilman

[11] Patent Number: 5,004,182

[45] Date of Patent: Apr. 2, 1991

[54] CONVERTIBLE BAIL OPENING SYSTEM

[75] Inventor: Richard R. Councilman, Collinsville, Okla.

[73] Assignee: Zebco Corporation, Tulsa, Okla.

[21] Appl. No.: 462,848

[22] Filed: Jan. 3, 1990

Related U.S. Application Data

[63] Continuation of Ser. No. 208,836, Jun. 15, 1988, abandoned, which is a continuation of Ser. No. 922,396, Oct. 23, 1986, abandoned.

[51] Int. Cl.[5] .................................................. A01K 89/01
[52] U.S. Cl. .................................................. 242/232
[58] Field of Search ........................ 242/231, 232, 233

[56] References Cited

U.S. PATENT DOCUMENTS

| 381,544 | 4/1888 | Garvey | 294/902 X |
|---|---|---|---|
| 2,971,720 | 2/1961 | Wood | 242/232 |
| 4,427,161 | 1/1984 | Sakamoto | 242/233 |
| 4,535,952 | 8/1985 | Carlsson | 242/84.2 G |

FOREIGN PATENT DOCUMENTS 53-32191 3/1978 Japan.
8502974 7/1985 PCT Int'l Appl..

*Primary Examiner*—John M. Jillions
*Attorney, Agent, or Firm*—Wood, Phillips, Mason, Recktenwald & Vansanten

[57] ABSTRACT

The invention contemplates incorporation into a reel of the type having a rotor with an associated bail that is movable between closed and open positions and automatically returns to a closed position upon the operation of a crank handle. According to the invention, structure is provided for selectively, removably attaching a trigger and a bail supporting member so that the reel can be used with the quick-release or manual systems and readily converted between the two systems as desired by the user.

14 Claims, 7 Drawing Sheets

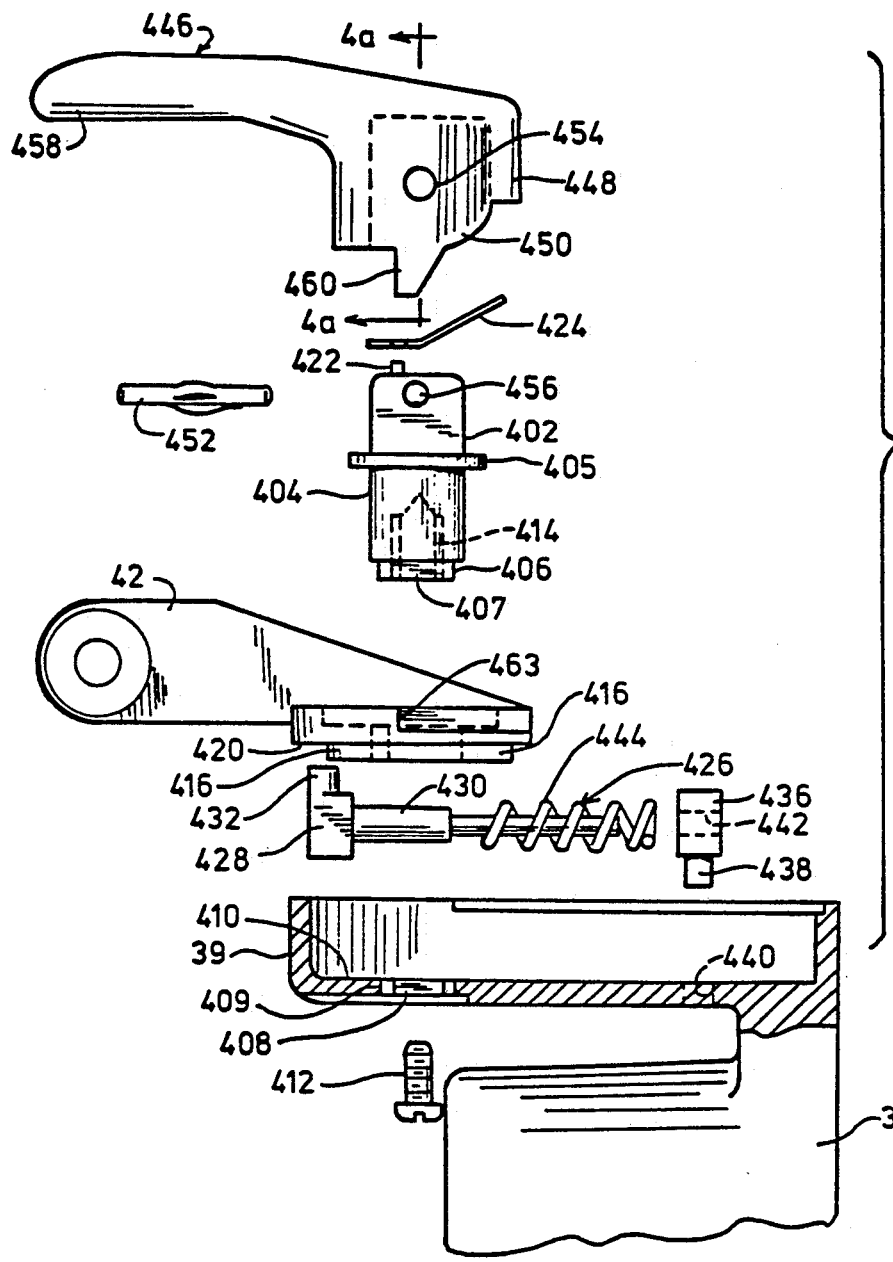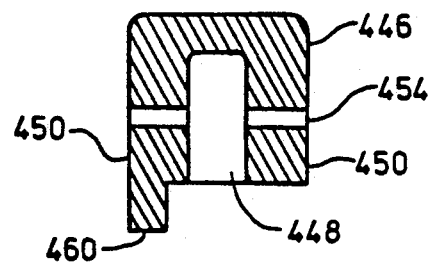

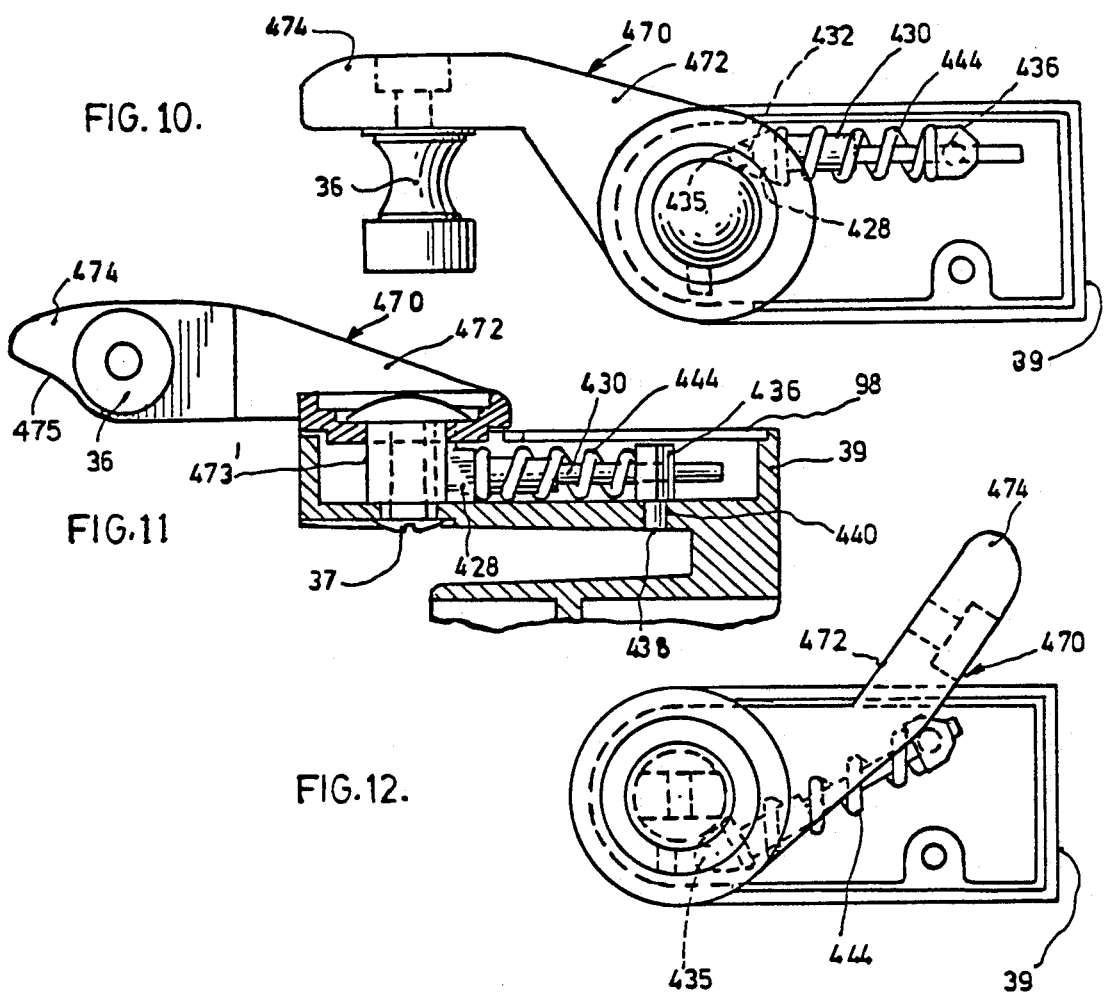

CONVERTIBLE BAIL OPENING SYSTEM

This is a continuation of application Ser. No. 922,396, filed Oct. 23, 1986, now abandoned.

BACKGROUND OF THE INVENTION

1. Field of the Invention

This invention relates to fishing reels with movable bails and, more particularly, to structure for conversion between quick-release and manually operated bail systems.

2. Background of the Prior Art

One well known type of spinning reel has a movable bail that is manually pivoted by a user between closed and open positions. In the open position, line can pay out freely from a line-carrying spool. The bail is carried on a rotor that is operable through a crank handle. Upon retrieving the line by rotating the crank handle, the bail automatically returns to its closed position and winds the line on the spool which reciprocates as the rotor operates.

One of the simplest versions of such a reel requires the user to manually grasp and pivot the bail from its closed to its open position. While some users find such an arrangement convenient, others prefer a quick-release mechanism, as shown and described in U.S. Pat. application Ser. No. 820,579, now U.S. Pat. No. 4,676,450 entitled "Quick Bail Opening System for Fishing Reel". With the quick-release system, a user can hold the fishing rod and with one finger grasp the line and manipulate a trigger to instantaneously throw the bail from its closed into its open position. With one movement of the finger, the user opens the bail and captures the line in position for a cast.

Heretofore, to accommodate the preference of all fishermen, two different reel types have been manufactured with either a manually operable or quick-release system incorporated. Manufacturers must therefore construct and inventory two distinct reel models. Manufacturing costs are thereby increased over an operation wherein only one reel model is constructed.

SUMMARY OF THE INVENTION

The present invention is specifically directed to overcoming the above enumerated problems in a novel and simple manner.

The invention contemplates incorporation into a reel of the type having a rotor with an associated bail that is movable between closed and open positions and automatically returns to a closed position upon the operation of a crank handle. According to the invention, structure is provided for selectively, removably attaching a trigger and a bail supporting member so that the reel can be used with the quick-release or manual systems and readily converted between the two systems as desired by the user.

Each of the trigger and supporting member has an associated post which extends through a bore in an arm on the bail and supports the arm for rotation thereabout. In one embodiment, a rotor ear supports the arm and the post extends through the bore in the bail arm and into the ear and is secured thereto as by a bolt or a spring-type clip.

Accordingly, the manufacturer need only make one reel model and at the option of the user, the reel can be used with either the quick-release system or the manual system.

BRIEF DESCRIPTION OF THE DRAWINGS

FIG. 4 is an exploded elevational view of the details of the preferred form of the invention shown in FIG. 1;

FIG. 4(a) is a cross-sectional view taken along the line 4a—4a of FIG. 4;

FIG. 10 is a top plan view of the modified form of the invention shown in FIGS. 2 and 9 with the remainder of the reel not shown;

FIG. 11 is an elevational sectional view of the modified form of invention shown in FIG. 10 only with the with the remainder of the reel not shown;

FIG. 12 is a top plan view of the modified form of the invention shown in FIG. 10 only with the bail in the casting position with the remainder of the reel not shown;

DESCRIPTION OF BASIC STRUCTURE AND OPERATION OF FISHING REEL

Figure 1:
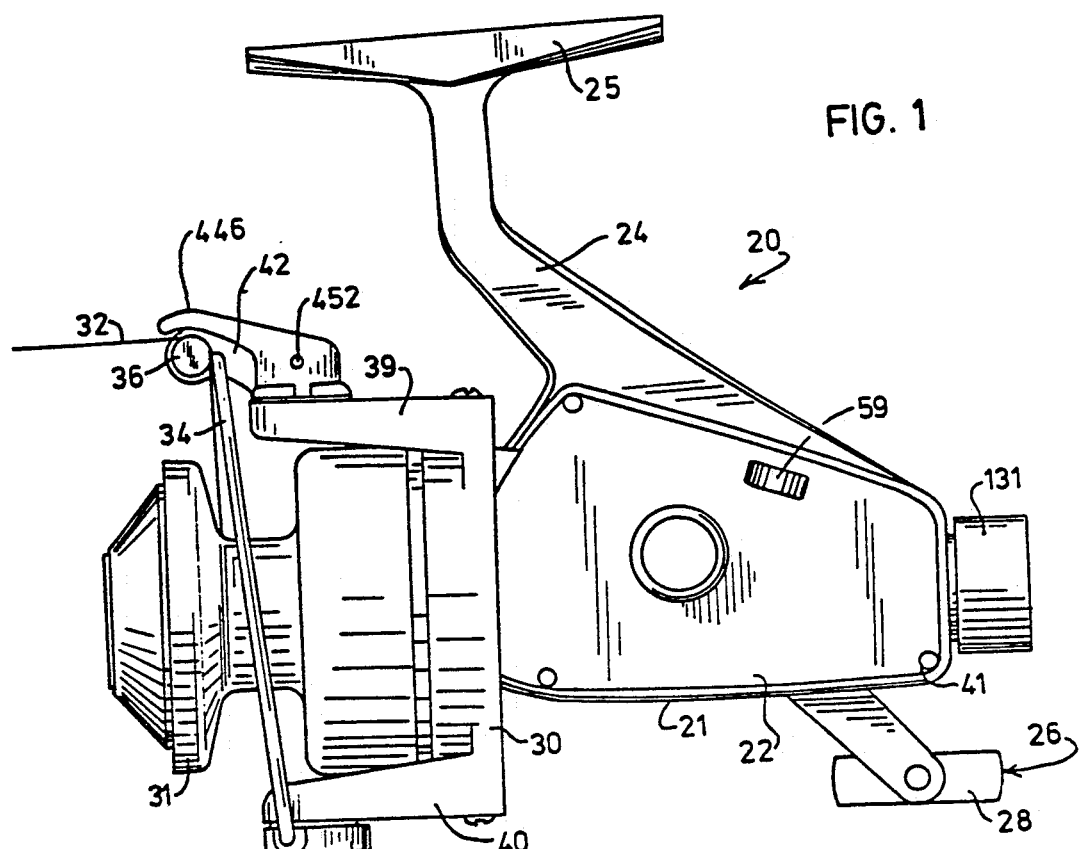
FIG. 1 is an elevation view of a skirted style spinning reel incorporating one form of quick bail opening mechanism according to the present invention.

A spinning reel 20 (FIGS. 1 and 3) or 20a (FIG. 2) has a housing which includes an integral gear case 23 (FIG. 3) over the opening of which is secured a cover 22 as by screws 41. The housing has a stem 24 which connects the housing to a shoe 25. The shoe 25 is used to attach the reel to a fishing rod. The reel includes a crank assembly 26, mounted on the housing 21 and rotatable about a crank shaft hub 27 with a rotatable winding handle 28 for use by a fisherman with his right hand for line retrieval, while the rod (not shown) is being held by the left hand. As is well known in the art, the handle 28 may be disposed on the other side of the housing 21 for accommodating the personal desires of the user.

Figure 3:
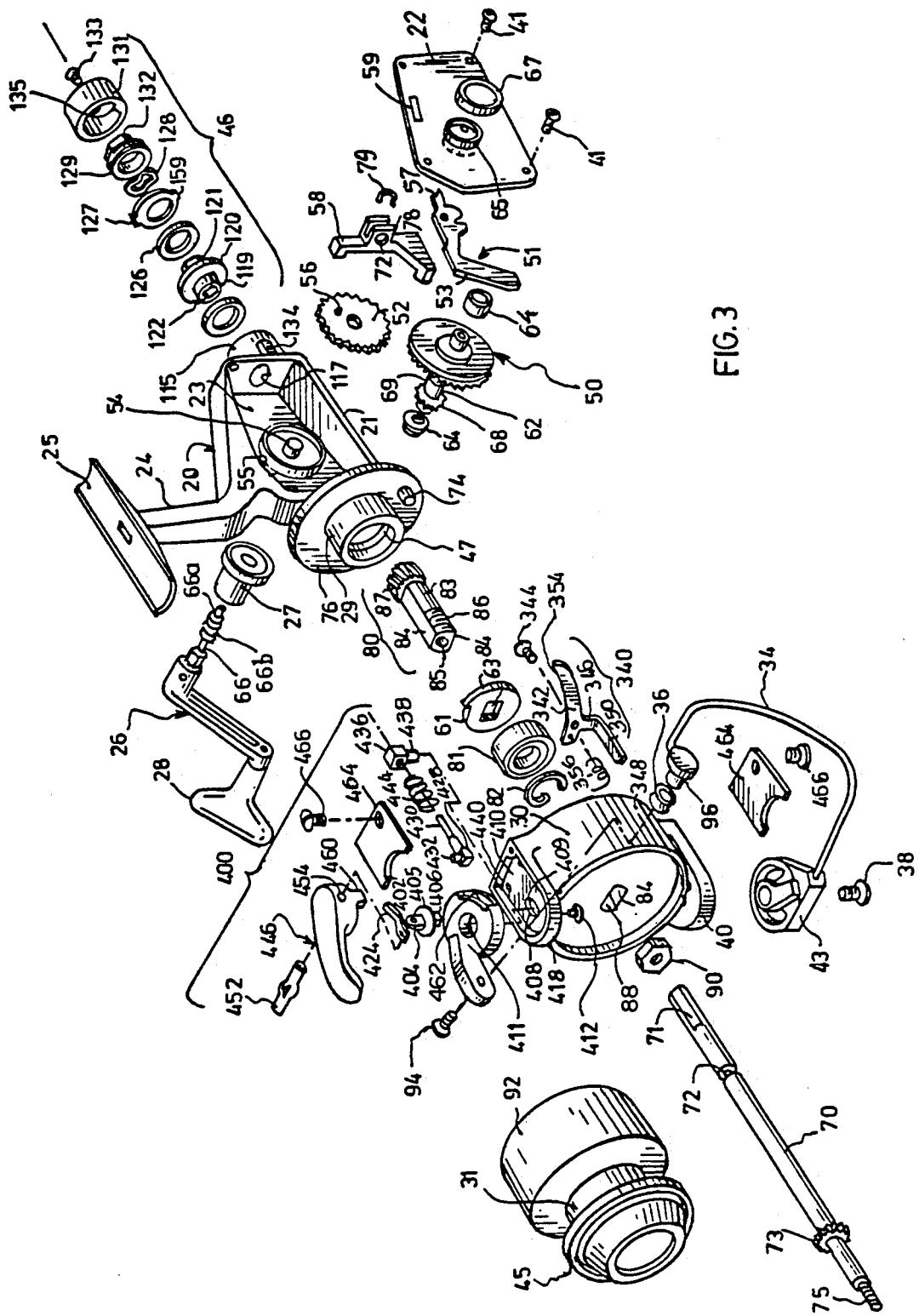
FIG. 3 is an exploded perspective view of the skirted style spinning reel of FIG. 1 incorporating the invention described herein.

Referring to FIG. 3 in particular, an axially mounted rotor 30 is provided and is adaptable to be rotated about the axis of a spool 31 as the crank 28 is turned for line retrieval, with a fishing line 32 being captured by a bail 34 passing over a line guide 36 as shown. Bail 34 and line guide 36 are mounted on bail axle arm 42 and bail hinge arm 43 which arms 42, 43 in turn are pivoted on bail ears 39 and 40. The bail ears 39, 40 are integral with the rotor 30 and rotate with rotor 30 whereupon the line 32 is wound on the spool 31.

Figure 2:
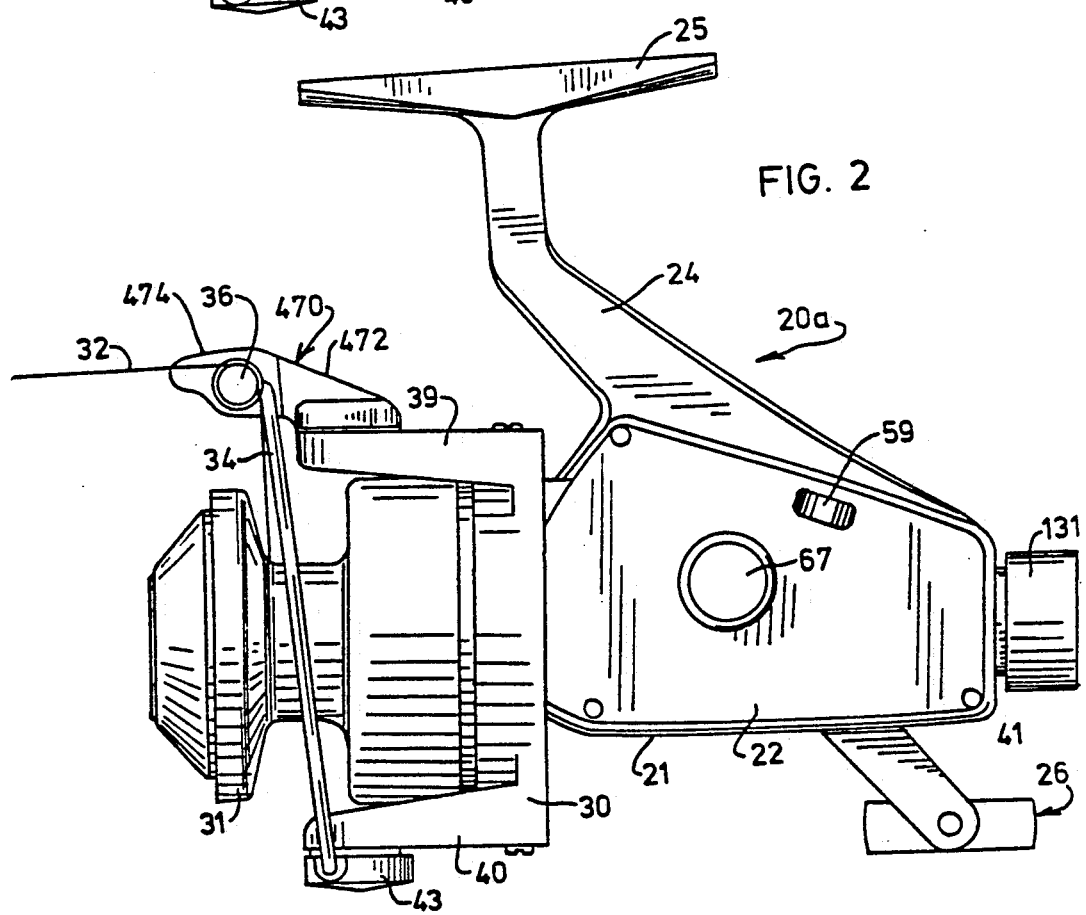
FIG. 2 is an elevation view of a skirted style spinning reel containing another form of quick bail opening mechanism according to the present invention.

A screw 38 passes through bail arm 43 and is threaded in the bail ear 40 and acts as the pivot for the bail arm 43. A bail arm post 402 which will be described in detail hereinafter and which is a part of the improved structure constituting a portion of the present invention, is secured to the bail ear 39 and provides the pivot for the other bail arm 42. The bail 34 which is connected to the bail arms 42, 43 pivots with bail arms 42, 43 about the axis of the screw 38 and bail arm post 402 between an open casting position and closed retrieving position. An internal mechanism causes the line spool 31 to reciprocate axially back and forth as the rotor 30 rotates winding the line 32 about the spool 31; but as in spinning reels generally, the spool 31 does not rotate about its central core axis, except as controllably permitted by the adjustable rear drag mechanism 46. Such permitted rotation of the spool may occur during line retrieval when an object on the terminal end of the line 32 exerts a force exceeding the friction setting of the drag, causing slippage and thereby preventing breaking the line 32. When the bail 34 is swung from the closed retrieve position to an open position for casting, the line 32 may freely pay out from the spool 31 over lip 45. In FIGS. 1 and 2, the bail 34 is shown in the "closed", "retrieve", or "rewind" position. The line guide roller 36 is preferably rotatable, that is, it is preferably a miniature pulley to reduce the sliding friction which might otherwise cause line wear.

The internal bail trip mechanism 340 can be any of the well known types on the market, but as illustrated, includes a bail trip lever 342 pivoted by screw 344 to the inside of the rotor 30 with a leg 346 passing through a slot (not shown) in the cylindrical wall 348 of the rotor which leg has a lever portion 350 disposed in the bail ear 40 in alignment with abutment 352 in the bail arm 43. The bail trip lever 342 has a cam portion 354 which when the lever 342 is pivoted in one direction, the cam moves from a position wherein the end of the cam 354 is in close proximity to the shaft 70, which is the bail open or cast position, to a second position wherein the cam 354 is along the inner surface of the cylindrical wall of the rotor, which is the bail closed or retrieve position. A torsion spring 356 is provided for holding the cam portion 354 of the trip lever 342 in close proximity to the inner surface of the cylindrical wall of the rotor so that it will not flop around freely as the rotor is rotated. A cam lug 74 is fixed on flange 76 on the reel housing and is positioned in the rear of the rotor 30 when the rotor is assembled with the reel housing. The cam lug 74 is located radially inward of the trip lever such that when the bail 34 is moved into the cast position the trip lever 342 is pivoted by the abutment 352 in the bail arm 43 so as to place the path of the cam portion 354 such that interference with lug 74 prevents reverse rotation of the rotor 30. Forward rotation of the rotor 30 by the crank 28 sweeps the cam portion of the trip lever 342 against the cam lug 74 which pivots the trip lever 342 causing lever 350 to apply sufficient force against abutment 352 to close the bail for line retrieval.

The bail 34 may be manually closed by using the same forefinger used to open the bail 34 by urging the bail arm 42 forward past the overcenter position.

In the overall arrangement of the reel the cover plate 22 is secured to the gear case 23 by screws 41. Inside the gear case 23 is a gear assembly 50 that is rotatable by rotating the handle 28 about the hub 27. The gear assembly 50, which includes the crank gear 69 and the oscillator pinion gear 68, which are integral with tubular shaft 62, and includes an oscillator gear 52 which is rotatably mounted on stub shaft 54, which may be part of the interior of the gear case 23 or secured separately thereto. Gear 52 has a projecting lug 56 that fits into a groove (not shown) in oscillator slider 58. Rotation of the oscillator gear 52 causes the slider 58 to slide forward and backward. Crank shaft gear assembly 50 has a tubular shaft 62 that is journal mounted in bearings 64 in bores (not shown) in gear case 23 and in a flange 65 on the inside of the cover plate 22. The shaft 62 has an internal right hand thread that mates with a right hand thread 66$a$ of shaft 66 on the crank assembly 26 on one side and a left hand thread that mates with left hand thread 66$b$ when the shaft is placed on the opposite side of the reel. This dual threaded system enables the handle 28 on the reel to be cranked either with the right hand or with the left hand, depending on the side on which handle 28 is mounted. The open end of the shaft 62 (the end in which the shaft 66 is not inserted) is closed off by inserting screw cap 67 on the end of the shaft either exterior of the cover 22 or exterior of the closed side of the gear case 23.

A pinion gear assembly 80 is forwardly rotatably journal mounted in bearing 81 that is mounted in the collar 29 on flange 76 of housing 21 and secured therein by bearing retainer 82 which fits into groove 47 in the collar 29. The assembly 80 has a forward shaft portion 83 with oppositely spaced flats 84 thereon, a central bore 85, a forward threaded portion 86 and a pinion gear 87 on the opposite end portion. A larger gear 69 on shaft 62 engages pinion gear 87 causing the pinion gear assembly 80 to rotate when the crank handle is rotated.

A center shaft 70 has a back or rear splined portion 71, undercut groove 72, an intermediate flange or stop 73, and a front threaded portion 75. The shaft 70 slip fits through the central bore 85 in shaft 83 and extends into the gear case 23. The shaft 70 also fits through the aligned holes 77 in parallel plates 78 in oscillator slider 58. Special clip 79 fits between the plates 78 and snaps into groove 72 in shaft 70 locking the shaft 70 to the slider 58. Thus, when the slider 58 oscillates back and forth the shaft 70 also moves back and forth with respect to the forward flange 76 of the housing 20.

The rotor 30 is mounted on the forward threaded portion 86 of assembly 80. The hole 88 in rotor 30 receives the shaft 83 with the flats 84 mating with the flats 89 of the hole 88. The nut 90 is tightened on the threaded portion 86 to secure the assembly 80 to the rotor 30. The spool 31 fits over the end of shaft 70 and is retained against stop 73 in a conventional manner which may include fastening on thread 75 on the shaft 70. Thus, as the handle 28 turns the crank shaft 66, the gear assembly 50 causes the pinion assembly 80 to rotate which in turn causes the rotor 30 to rotate. At the same time rotation of gear 52 by gear 68 on gear assembly 50 causes the slider 58 to reciprocate back and forth, which causes the center shaft 70 to oscillate back and forth so that line 32 can be wound during the retrieve mode in an orderly and uniform fashion on spool 31.

As shown in FIG. 3, a drag boss 115 is provided on the rear of the housing 21 with a bore 117 extending through the rear wall of the housing 21. The center shaft 70 has the splined rear portion 71 extending through the bore 117 and into the boss 115. The rear drag 46 is assembled in the drag boss 115. The inner surface 117 of the boss is the bearing surface which radially supports the drag driver 118. The drag driver 118 is comprised of a driver boss 119, a flange 120 and a pilot boss 121. The driver boss 119 has internal flats or splines 122 which mate with the flats or spline 71 on the center shaft 70. A friction washer 124 is located between the flange 120 and the housing wall drag surface (not shown) with the pilot boss 121 projecting through the drag boss 115 and having the outer end portion of the driver boss extending into the gear case 23. A second friction washer 126 is radially positioned by driver boss 119 on the outer side of the flange 120. A drag stationary washer 127 encircles the driver boss 119 and is restrained from rotating by engagement of its radially opposed lugs 159 in the radially opposed internal keyways (not shown) on the boss 115. A spring washer 128 encircles the driver boss 119 and applies pressure to the friction washers, which pressure is varied by rotation of the threaded adjustment sleeve 129 which mates with internal threads (not shown) on boss 115. A polygon or splined boss 132 on the adjustment screw 129 mates an internal polygon or spline (not shown) on drag knob 131. Attachment of the drag knob 131 to the sleeve 129 is by a drag knob retainer screw 133. Rotation of the drag knob 131 is limited to one turn, to prevent unintentional removal. The limited rotation is provided by a tang 134 on the periphery of the boss 115, which interrupts rotation by interference with a key 135 on the interior of the flange on drag knob 131.

An anti-reverse self-centering structure 51 is provided in the gear case 23 and includes a pawl 53 pivoted on the post 55 in the gear case 23 with an actuating cam 57 on one end of the pawl in engaging alignment with a slide actuator button 59 on the cover plate 22. The pawl 53 selectively engages the one way tooth 61 on the ratchet 63 which ratchet is keyed on the flats 84 on the pinion gear assembly 80. With the button 59 on the cover 22 in the "on" position, the pawl 53 is pivoted into contact with the tooth 61 on ratchet 63 to prevent reverse rotation of the rotor 30 and to self-center the rotor relative to the housing. When the button 59 is in the "off" position the rotor can rotate in either direction. The tooth 61 on the ratchet 63 is oriented such that engagement of the pawl 53 with the tooth aligns the bail ears 39, 40 and bail arms 42, 43 along an axis parallel with the axis of the stem 24.

DESCRIPTION OF THE PREFERRED EMBODIMENT

Referring to FIGS. 1 and 3-8, an apparatus 400 for rapidly opening the bail 34 for casting is shown and is operatively associated with the bail arm 42. Specifically, a bail arm post 402 has one end portion 404 bounded on one end by an intermediate flange 405 and on its lower end by an extension 406. The end portion 404 extends through opening 411 in the bail arm 42 with flats 407 on the extension mating with flats 408 in the opening 409 in the bottom wall 410 of the bail ear 39. A screw 412 is threaded from below bail ear 39 into a threaded opening 414 (FIG. 4) in the end of the bail arm post 402 with the head of the screw overlapping the bail ear 39 to retain the bail arm post 402 in a fixed orientation on the bail ear 39. The bail arm 42 has a circular offset projection 416 which seats down into a mating semicircular part 418 of bail ear 39 such that the axial shoulder 420 of the bail arm 42 around projection 416 rotatably rides on the upper face of the wall of the bail ear 39 with the flange 405 on bail arm post 402 overlapping the upper surface of the bail arm. A fastening stud 422 on the upper end of the bail arm post 402 engages with a spring member 424 to retain the spring on the post.

Figure 5:
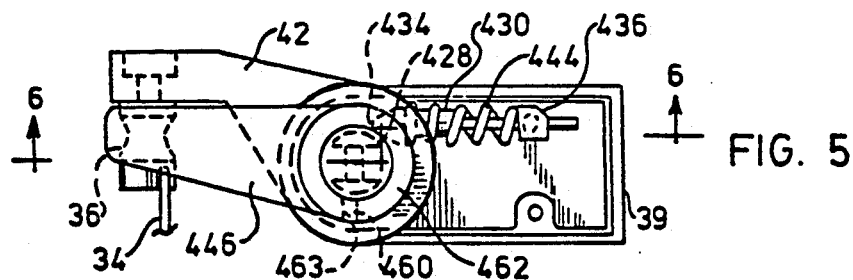
FIG. 5 is a top plan view of the invention shown in FIG. 1 with the bail in the retrieve position with the remainder of the reel not shown.
Figure 6:
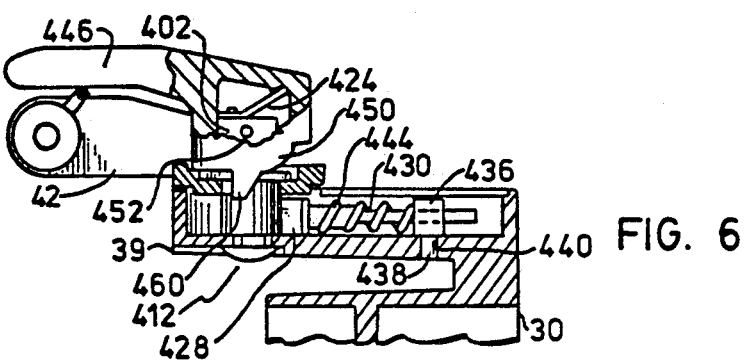
FIG. 6 is an elevational view of the form of invention shown in FIG. 5 with the remainder of the reel not shown.
Figure 6A:
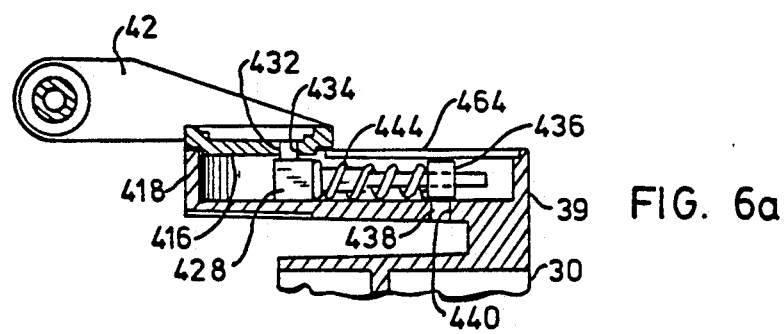
FIG. 6(a) is a sectional view taken along the lines 6-6 of FIG. 5 with the remainder of the reel not shown.
Figure 7:
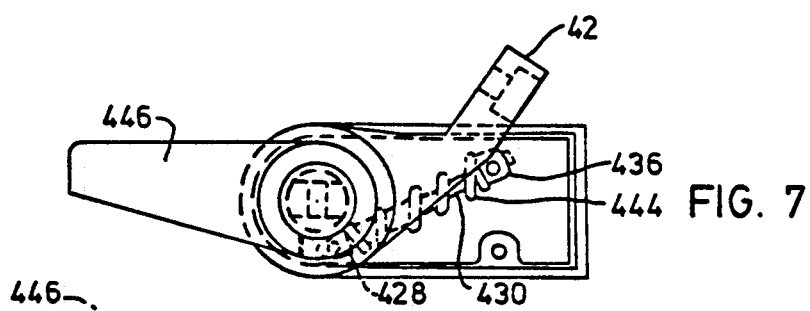
FIG. 7 is a top plan view of the invention shown in FIG. 5 only with the bail in the cast position with the remainder of the reel not shown.
Figure 8:
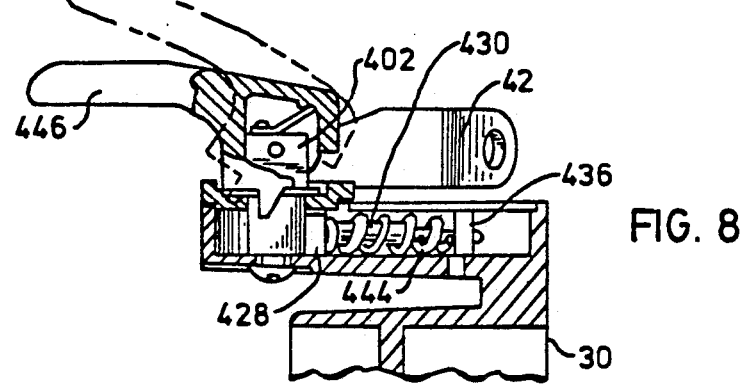
FIG. 8 is an elevational view of the invention shown in FIG. 7 with the trigger in a raised phantom line position which is the position of the trigger for quick opening the bail and in the released solid line position of the trigger.

Between the bail arm 42 and the bail ear 39 is an overcenter apparatus 426 which includes a front pivot post 428 having a guide rod 430 fixed thereon and extending in a direction transverse to a pivot 432. The pivot 432 projects upwardly into pivoting relation in an opening 434 in the undersurface of the bail arm 42. The opening 434, as shown in FIGS. 5 and 6, is formed in the lower surface of the bail arm 42 and is offset radially outwardly from the pivot center of the bail arm 42. A back pivot post 436 has a pivot 438 pivotally projecting into opening 440 in the bottom wall 410 of the bail ear 39 and has a transverse opening 442 extending therethrough in which opening the outer end portion of the guide rod 430 is slidably received. A compression spring 444 encircles the guide rod 430 and exerts a force against the front pivot post 428 and against the bail arm 42 tending to rotate the bail arm 42 counterclockwise about the bail arm post 402 (as viewed in FIG. 5).

A finger trigger 446 has a hollowed body portion 448 which provides spaced legs 450 which straddle the upper end portion of the bail arm post 402. A pin 452 passes through openings 454 in the legs and through an opening 456 in the bail arm post 402. The spring 424 bears against the under rear surface of the body portion 448 of the trigger to pivot the finger grip portion 458 downward toward the bail arm 42. One leg 450 of the body portion of the trigger has a depending actuating lug 460 which seats in a cut out slot or groove 462 in the bail arm 42. In the retrieve position of the bail arm 42, FIG. 5, the lug 460 bears against an abutment 463 at one end of the groove or slot 462. Cover plates 464 are secured to the bail ears 39, 40 by screws 466 which, in the case of bail ear 42, serves to retain pivot post 436 seated in its opening in the bail ear 39. The covers will also keep foreign matter out of the bail ears 39, 40.

As is best illustrated in FIGS. 3, 5-8, with the bail 34 in the retrieve position (FIGS. 5, 6), the handle 28 (FIG. 3) is rotated in reverse which will engage the self-centering mechanism to align the bail ears 39, 40 and bail arms 42, 43 on the rotor in a line parallel with the stem 24. When it is desired to cast the line, the index finger of the hand holding the rod is extended over the grip portion 458 of the trigger 446 which index finger will also pick up the line 32. Upward movement of the end of the trigger will pivot the trigger 446 and lug 460, which lug 460 will pivot the bail arm 42, bail 34 and bail arm 43 about the axis of the post 402 and screw 38 and will further start to compress the spring 444. As the bail arm 42 pivots, the axis of the guide pin 430 will approach a dead center position with the axis of the guide pin intersecting the pivot axis of the bail arm. Once the bail arm 42 is moved to a position whereby the axis of the guide pin 430 is beyond dead center, the compressed force of the spring 444 will drive the bail arms 42, 43, and bail to the open, casting position. The trigger 446 will be in the dotted line position of FIG. 8. The finger of the fisherman will slip off the end of the trigger 446, which trigger 446 will return to its down solid line position of FIG. 8. The line 32 will still be over the index finger of the user, which can be used to control the cast.

When the cast has been made, the handle 28 is rotated for line retrieval which will rotate the rotor 30 and engage the lug 74 with the trip lever 342 of the bail trip mechanism 340 to pivot the bail arms 42, 43 and bail 34 to the retrieve position ready to reel in the line.

Figure 9:
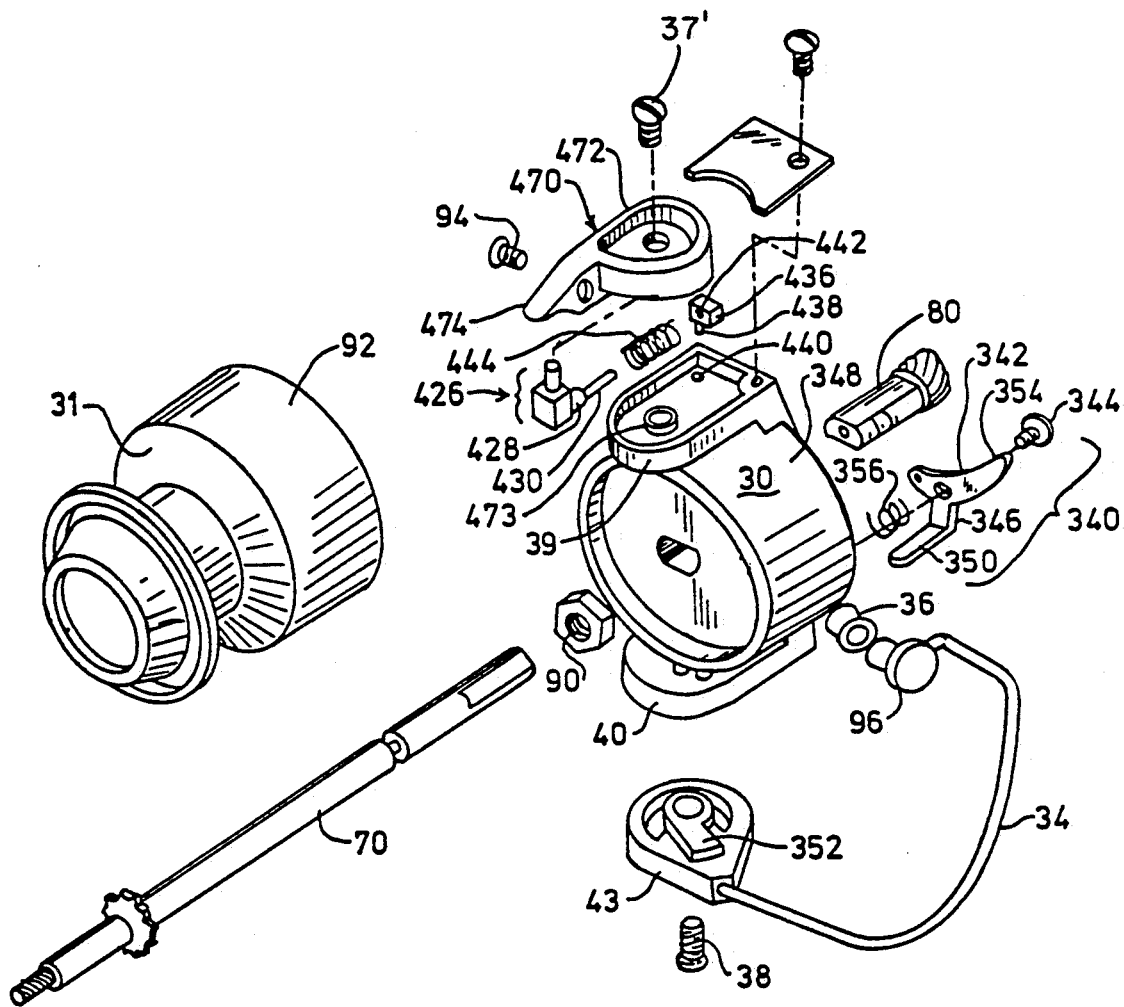
FIG. 9 is a partial exploded perspective view of the modified form of invention shown in FIG. 2.

Referring to the second preferred form shown in FIGS. 2, and 9-12, and in particular FIG. 9, a single horn member 470 is provided, which horn member is a combination of the trigger and bail arm of the version of the invention shown in FIGS. 3-8. The horn member 470 serves as a bail arm 472 for mounting the one end of the bail 34 on the rotor and as a finger grip 474 extending outwardly beyond the plane of the bail. As will be noted in FIG. 10 the finger grip 474, when the bail is closed, is offset from the pivot axis of the bail arm 472. The housing 21, gear assembly 50, oscillating mechanism, rear drag 46 and self-centering mechanism 51 described with respect to FIG. 3 is incorporated herein. The center shaft 70 is slidable and oscillatable in the pinion gear assembly 83 with the rotor 30 secured to the pinion gear assembly by nut 90. The spool 31 is removably attached to the center shaft 70 with the skirt 92 encircling a forward part of cylindrical wall 348 of the rotor 30. The internal bail trip mechanism 340 can be the same as was described hereinabove with respect to FIG. 3. The bail 34 may also be manually closed by applying a forward pressure urging bail arm 472 to rotate past the overcenter position using the same forefinger used to open the bail 34.

The bail arm 472 is pivotally mounted on the bail ear 39 by screw 37 passing through the bail arm and into a cylindrical nut 473' with an enlarged head that captures the bail arm 472 in operative position in conjunction with the screw 37. Alternatively, as shown in FIG. 9, a screw 37' can be directed into a threaded bore in the boss 473 on the bail ear 39. The line guide 36 is rotatably mounted on the bail arm 472 by a screw 94 passing through the bail arm 472 and into the bail axle 96. The other bail arm 43 is pivoted to the bail ear 40 by screw 38 such that the bail 34 has a pivot axis about the axis of the screws 37, 38 between an open casting position and a closed retrieving position.

The overcenter apparatus 426 of FIGS. 3-8 is employed in this second preferred form and includes the front pivot post 428 having the guide rod 430 thereon slidably passing through opening 442 in the back pivot post 436. The pivot 432 on post 428 pivots in an opening 435 in the bail arm 472 and the pivot 438 on post 436 pivots in opening 440 in the bail ear 39. Compression spring 444 encircles guide 430 between posts 428 and 436 to hold the bail 34 in the closed retrieve position. Opening 435 is off-center (FIG. 10) of the pivot axis of the bail arm 472 to provide the leverage for holding the bail closed. A shaped cover plate 98 is secured over the open portion of the bail ear 39 by screw 99 to retain pivot post 436 in position in the bail ear and to prevent accumulation of dirt and the like in the bail ear.

With the bail 34 in the closed retrieve position and with the self-centering anti-reverse mechanism 51 operative, the crank 28 is rotated in reverse which will engage the self-centering pawl 53 with the tooth 61 on the ratchet 63. In the self-centering position, the rotor 30 will be positioned with the bail ears 39, 40 and bail arms 472, 43 aligned along an axis substantially parallel with the axis of the stem 24 which will position the finger grip 474 of the horn member 470 below and in vertical alignment with the foot 25 and rod (not shown). A fisherman using the hand that is holding the rod can extend the index finger to a position below and slightly encircling the finger grip 474 which in the process may also pick-up the line extending out from the line guide 36. Now whenever the fisherman wants to cast the line he applies an upward pull on the finger grip 474. The grip 474 is offset from the axis of the bail arm 472 and has a curved underside surface 475 configured so that it tends to slide up the finger on the grip 474 as the operator's finger applies the upward force on the grip surface 475 thereby tending to pivot the bail arm 472 about the axis of screw 37. When the axis of the guide pin 430 and spring 444 passes from the position of FIG. 10 (bail closed) past the common line extending from the rear post 436 through the axis of the pin 37, the compressive forces in the spring 444 will take over and snap the bail arms 472, 43 with bail 34 to the open casting position (FIG. 12). The finger of the fisherman will be slipped off the finger grip 474 but, if desired, will still have the line retained thereover ready for casting the line.

When it is desired to retrieve the line, the crank is turned forward which will start to rotate the rotor causing the cam surface 354 on bail trip 340 to engage lug 74 to trip the bail 34 and return the bail to the closed retrieve position.

Figures 13, 14:
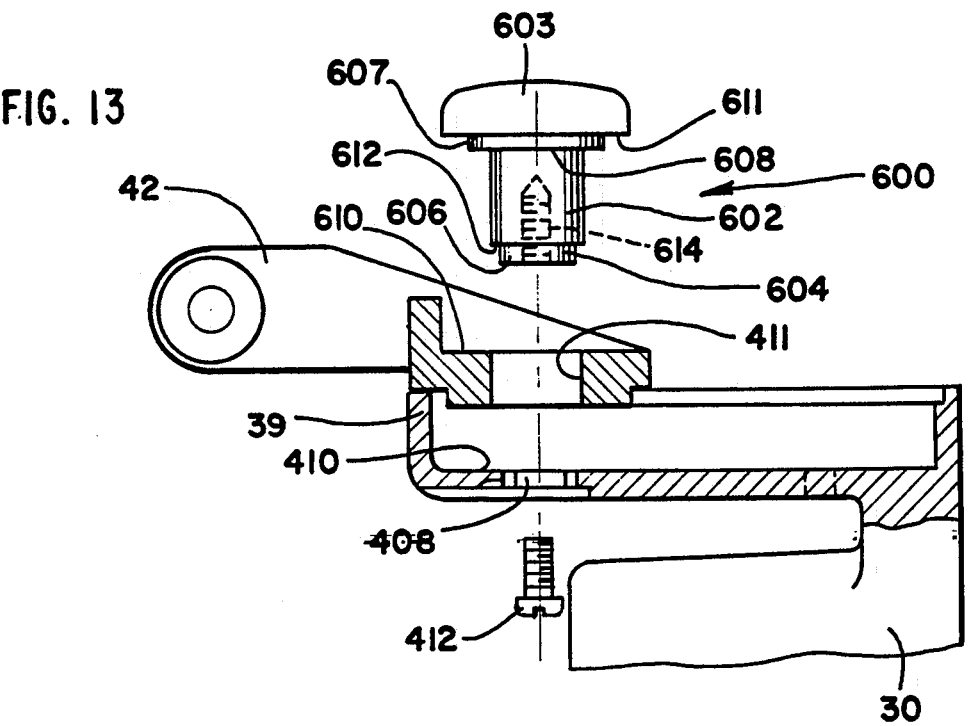
FIG. 13 is a view as in FIG. 4 with a manually operated bail system according to the present invention.
FIG. 14 is a view as in FIG. 13 with an alternative type of structure to that in FIG. 13 for mounting either the quick bail opening mechanism or manually operated bail mechanism according to the invention.

According to the invention, structure is provided for readily converting the reel back and forth between the quick release system described above and a manually controlled system wherein a user must grab the bail and manually move it from its closed position to its open position. As seen clearly in FIGS. 3, 4, 6, 8 and 11, the trigger 446 and associated post 502 can be separated from the reel rotor 30 upon removal of the screw 412 extending through the bail ear 39, bail arm 42 and into the post 502. As seen in FIG. 13, the invention contemplates a bail supporting member at 600 which can be substituted in place of the post 502 and trigger 446.

The supporting member 600 has a cylindrical post or body 602, corresponding to the one end portion 404 of the trigger assembly, which closely seats in the bail arm opening 411 to mount and guide rotation of the bail arm. An extension 604 at the free end of the body 602 has diametrically opposed flats 606 which make keyed connection with the flats 408 in the bail ear 39. The supporting member 600 has an enlarged head 603 which has an extension 607 defining an annular shoulder 608 which, with the bail supporting member in a fully seated position, makes facial engagement with a wall surface 610 on the bail arm 42. The extension 607 maintains the head 603 slightly spaced from the underside 611 of wall 410 to facilitate removal of the supporting member 600 from the reel. The body 602 defines a second annular shoulder 612 around the reduced diameter extension 604, which shoulder 612 abuts the bottom wall 410 of the bail ear upon the supporting member 600 realizing its fully seated position. The body 602 has a coaxially arranged, blind, threaded bore 614 which accepts the screw 412 so as to secure the connection of the supporting member to the rotor 30.

It can be seen that the bail arm 42 is supported by and pivots around the bail supporting member 600 in the same manner as it was supported by and pivoted around the bail arm post 502 in the previously described structure. However, the quick opening bail structure in FIG. 13 is eliminated so that a user must manually move the bail from its closed to its open position. Conversion back and forth between the manual and quick opening systems is readily accomplished by removal of the screw 412 and replacing one of the trigger 446 and post 502 and bail supporting member 600 with the other of the trigger 446 and post 502 and bail supporting member 600.

In FIG. 14, alternative structure to the screw connection of the trigger arm 42 and post 502 and bail supporting member 600 is shown. The bail arm 42 and bail ear 39 are the same structures shown in FIG. 13. The difference resides in the configuration of the post 502 associated with the trigger 446 and the cylindrical body 602 on the bail supporting member.

Taking first the supporting member 600, the extension 604 of the prior embodiment is lengthened in an axial direction to define a cylindrical extension 616 with an axial extent sufficient to extend through the bail ear opening 409 and protrude beneath the bottom wall 410. The extension 616 has an annular groove 618 that aligns immediately beneath the underside 620 of the wall 410. A conventional spring-type C-clip 622 is pressed into the groove and makes snap connection with the groove 618 of the extension 616. The extension 604 above the groove 618 has flats 606 which make keyed connection with the flats 408 defined in the opening 409 in the bail ear. Accordingly, the flats prevent rotation of the post 602 relative to the ear while the cooperating clip 622 and extension 616 prevent axial shifting of the post 602. The structure otherwise operates as the structure previously described.

The post 502 has an extension 716 that is identical to the extension 616 and operates in the same manner to hold the trigger 446 on the bail ear 39 with the bail arm 42 captive.

The foregoing detailed description was made for purposes of demonstrating the inventive structure and the basic operation thereof, with no unnecessary limitations to be understood therefrom.

I claim:

1. In combination:
    a fishing reel having a line-carrying spool, a rotor, a crank handle operable through a gear train to rotate the rotor and thereby direct line onto the spool, and a bail on the rotor and having associated first and second arms attached to the rotor for rotation relative thereto so as to thereby be movable between a closed retrieving position and an open casting position;
    a first post;
    a trigger;
    means on the first post for mounting the trigger for movement relative to the first post between a first position and a second position;
    cooperating means on the first post and rotor for removably attaching the post to the rotor so that the post supports one of the first and second arms on the rotor for rotation relative to the rotor about said post;
    cooperating means on the trigger and bail for causing the bail to be moved from the retrieving position towards the casting position in response to said trigger being moved from said first position to said second position with said first post attached to the rotor;
    a bail supporting member having a second post and having no means as on said first post for mounting a trigger thereon; and
    cooperating means on the second post and rotor for removably attaching the second post to the rotor to support the one of the first and second arms on the rotor for rotation relative to the rotor about the second post on the bail supporting member,
    whereby with the second post on the bail supporting member attached to the rotor the bail must be manually moved by a user from the closed position to the open position and a user can selectively, interchangeably attach and use one of the trigger and associated first post and bail supporting member and second post so that the reel can be used with and without a trigger at the desire of a user.

2. The combination of claim 1 wherein the rotor has an associated ear, the one bail arm has a bore, each of the first and second posts extends through the one bail arm bore from a side of the one arm and has a portion projecting from another side of the one bail arm and the means for removably attaching the posts to the rotor removably attaches the portions of the posts projecting from the another side of the one bail arm.

3. The combination of claim 2 wherein the means for removably attaching each post to the rotor comprises a clip ring.

4. The combination of claim 2 wherein the means for removably attaching each post to the rotor comprises a screw extending through the rotor ear and into the post portion projecting from the one bail arm.

5. The combination according to claim 1 wherein the one bail arm has a bore, the means on each said first and second post cooperating with the rotor comprises an end that extends through the bore in the one arm to support the one arm for rotation relative to the rotor about an axis and an enlarged flange which maintains the one arm captive in conjunction with the rotor.

6. The combination according to claim wherein said second post has an enlarged head and the mounting means on the first post extends axially with respect to the axis of rotation of the first arm further from the flange on the second post than the enlarged head extends from the flange on the first post with the first and second posts in an operative position.

7. The combination according to claim 6 wherein said second post has an uninterrupted, substantially flat surface that is transverse to the axis of rotation of the first arm.

8. In combination:
    a fishing reel having a line-carrying spool, a rotor, a crank handle operable through a gear train to rotate the rotor and thereby direct line onto the spool, a bail having first and second spaced arms, means for pivotally attaching one of the first and second arms to the rotor for rotation relative to the rotor about an axis, and a bore coaxial with the pivot axis of the one of the first and second arms on the other of the first and second arms;
    a first post for extension through the bore in the other of the first and second arms;
    cooperating means on the rotor and first post for removably attaching the post to the rotor to support the other of the first and second arms on the rotor for rotation relative to the rotor about the rotational axis of the one of the first and second arms,
    whereby the bail and first and second arms are rotatable about said axis between a closed retrieving position and an open casting position;
    a one-piece trigger having a portion engageable with the one bail arm;

means pivotably mounting the trigger to the first post for movement between a first position and a second position and so that movement of the trigger from the first position to the second position moves the trigger portion against the one bail arm and thereby shifts the bail from its closed position towards its open position with the post attached to the rotor;

a second post without a trigger for extension through the bore in the other of the first and second bail arms, said second post having a different configuration than the first post without the trigger on said first post; and cooperating means on the second post and rotor for removably attaching the second post to the rotor with the second post extended through the bore in the other bail arm so that the other bail arm is rotatable relative to the rotor about said axis around the second post on the supporting member, whereby a user can selectively attach one of the first post and second post to the rotor and with the second post attached to the rotor, a user must manually grasp and move the bail between its closed and open positions.

9. The combination of claim 8 wherein each post has a portion extending through the other bail arm and the means for removably attaching each post to the rotor removably connects to the portion extending through the one bail arm.

10. The combination according to claim 8 wherein said first and second posts are each molded as a single piece.

11. The combination according to claim 10 wherein said second post has an enlarged head with an exposed flat surface, the plane of which extends generally parallel to the rotational axis of the rotor.

12. The combination according to claim 8 wherein said second post does not have any means therein as on said first post for pivotably mounting a trigger thereto.

13. The combination of claim 8 wherein the rotor has an ear and the means removably attaching each post to the rotor removably attaches the posts to the ear.

14. A fishing reel of the type having a rotor, a line-carrying spool, a bail with a bail arm to be mounted to the rotor for rotation of the bail relative to the rotor about an axis between a cast position wherein line can freely pay out of the spool and a retrieve position wherein the rotor can be rotated to direct line onto the spool, a first post to mount the bail arm to the rotor for rotation relative to the rotor, a trigger, means on the first post for mounting the trigger for movement relative to the first post so as to thereby engage the bail and move the bail from its retrieve position to its cast position as the trigger is moved relative to the first post, a second post without trigger mounting means as on the first post to mount the bail arm for rotation relative to the rotor, and means on said reel rotor and first and second posts for engaging and mounting selectively one of said first post and second post to maintain the bail arm rotatably on said rotor.

* * * * *

UNITED STATES PATENT AND TRADEMARK OFFICE
CERTIFICATE OF CORRECTION

PATENT NO. : 5,004,182
DATED : April 2, 1991
INVENTOR(S) : Richard R. Councilman It is certified that error appears in the above-identified patent and that said Letters Patent is hereby corrected as shown below:

Column 8, line 51 change --of--to--and--and change --410--to--610--.

Column 10, claim 6, line 34, insert --5-- after claim--.

Signed and Sealed this

Fourth Day of May, 1993

*Attest:*

MICHAEL K. KIRK

*Attesting Officer*    *Acting Commissioner of Patents and Trademarks*